United States Patent Office 3,523,860
Patented Aug. 11, 1970

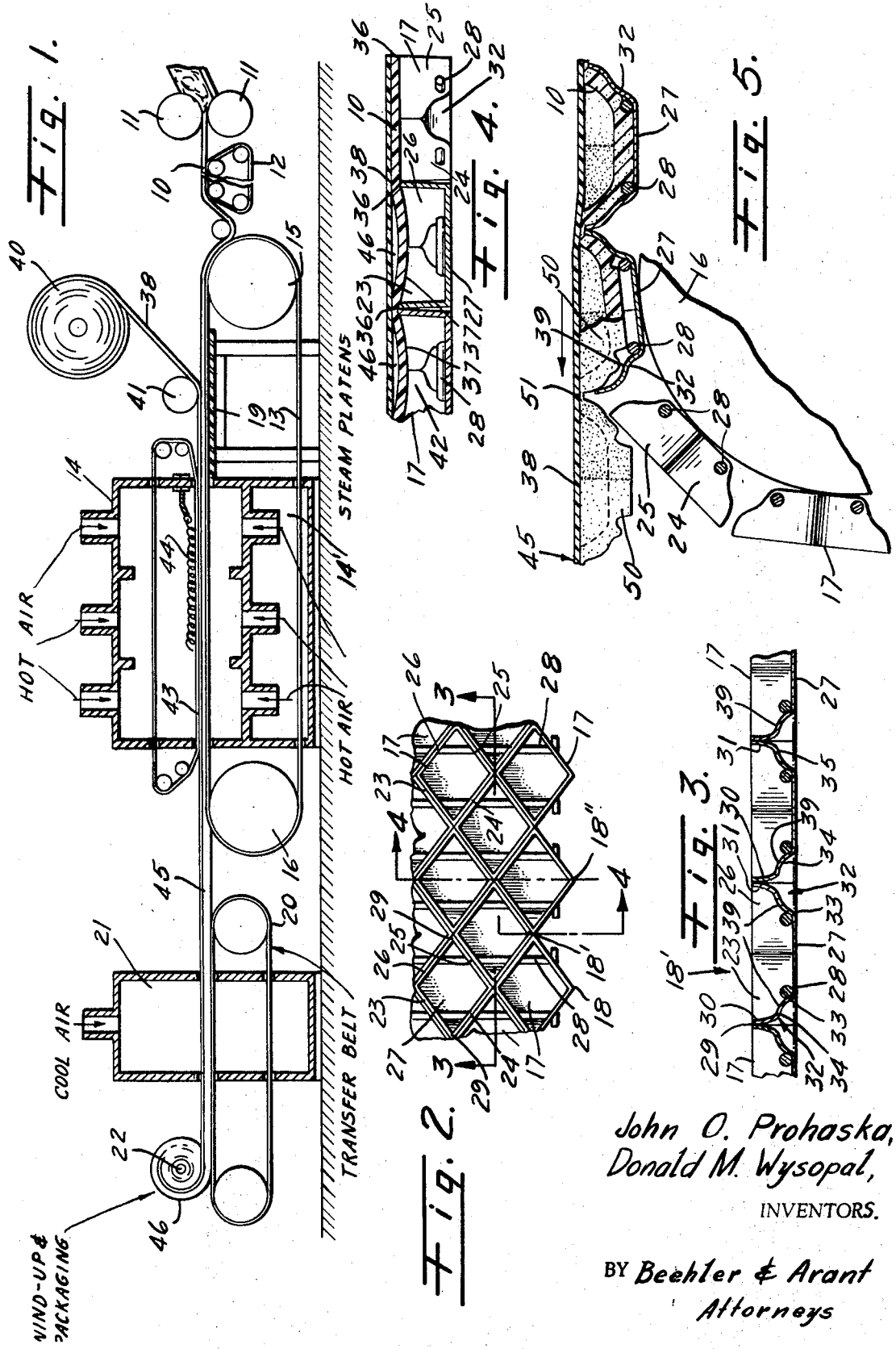

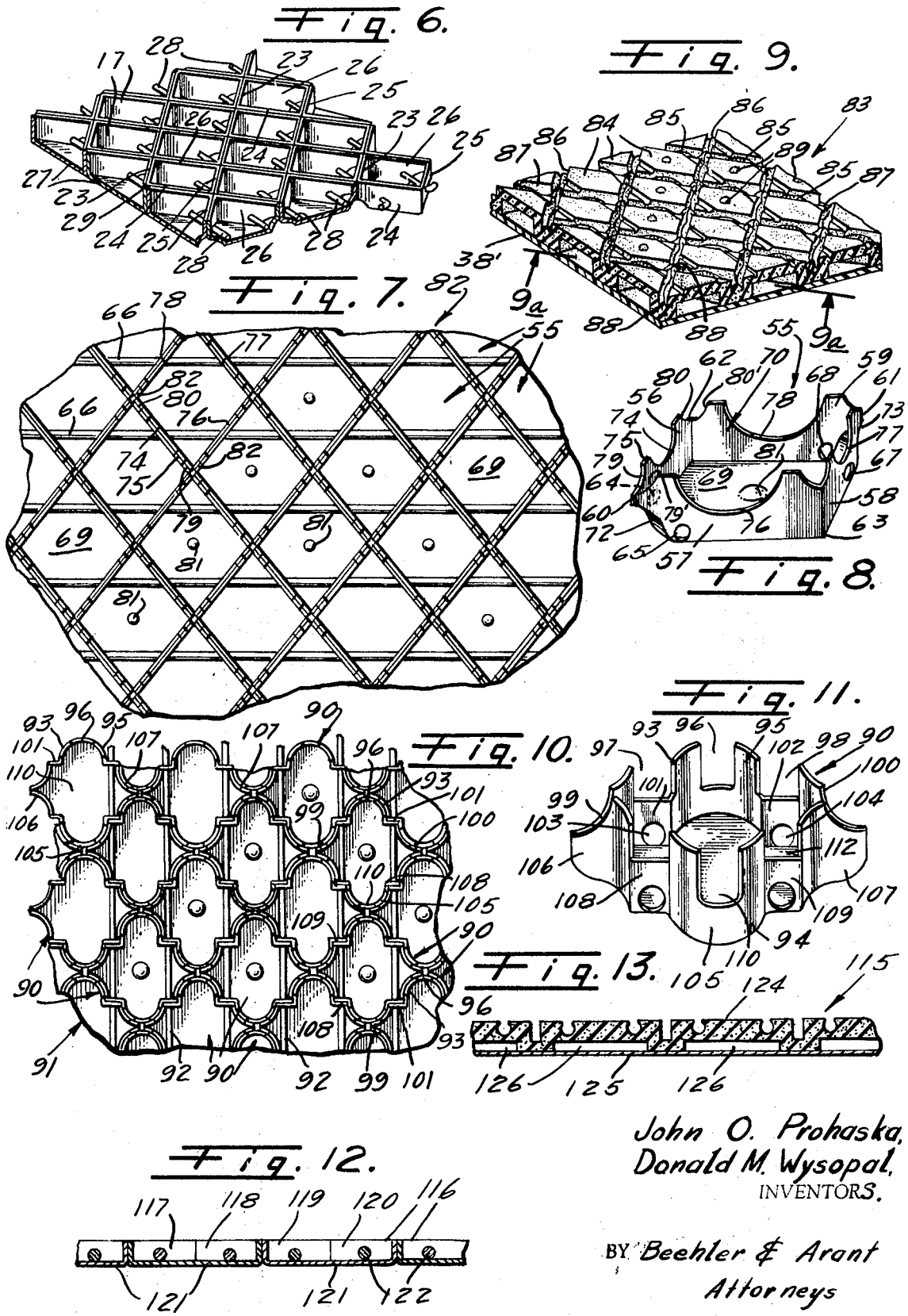

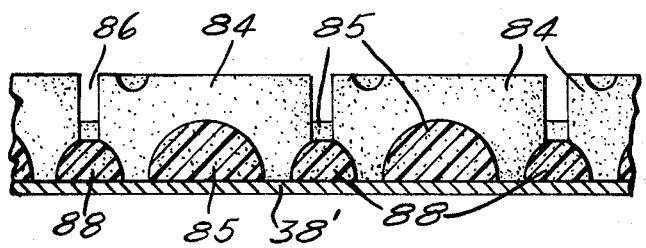
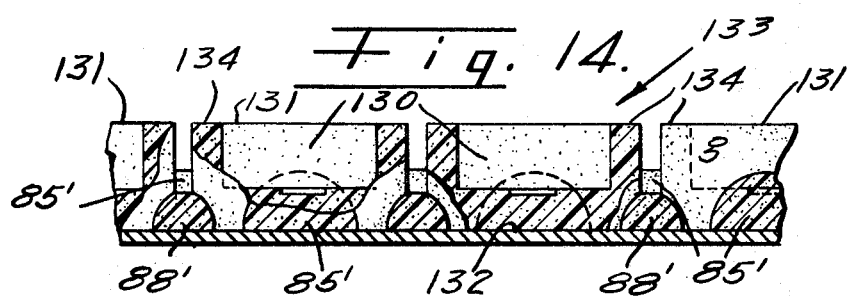
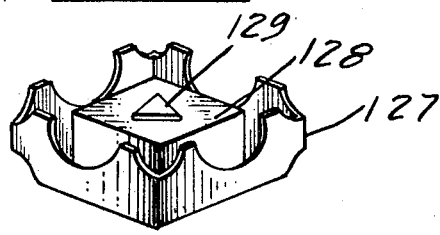

---

3,523,860
SPONGE RUBBER PADDING
John O. Prohaska and Donald M. Wysopal, Capistrano Beach, Calif., assignors to Ludlow Corporation, Los Angeles, Calif., a corporation of Massachusetts
Continuation-in-part of application Ser. No. 431,516, Feb. 10, 1965. This application Apr. 4, 1966, Ser. No 539,814
Int. Cl. B32b 3/26, 5/18
U.S. Cl. 161—122           8 Claims

ABSTRACT OF THE DISCLOSURE

A resilient cushion of the type used under carpets consisting of a pattern of hollow sponge rubber buttons of uniform shape and size and having flat bottoms. Each button has relatively straight side walls standing substantially perpendicular to the plane of the flat bottoms, the side walls of each button being spaced from all adjacent side walls of all adjacent buttons. Edges of the side walls are integrally joined to respective adjacent edges of adjacent buttons and an impervious non-stretchable rubber impregnated sheet is attached to all the edges of said buttons closing hollow interiors of the buttons.

---

This is a continuation-in-part of patent application Ser. No. 431,516 filed Feb. 10, 1965 and issued as U.S. Pat. No. 3,426,388.

The present invention is particularly applicable to plastice yieldable resilient material for use as a carpet underlay of which sponge rubber is an example and it will be described with particular reference thereto; however, it is to be appreciated that the invention has much broader applications and may be equally applied to padding of yieldable resilient material used for other purposes.

Carpet underlay has long taken the form of a flat sheet of blown sponge natural or synthetic rubber having a fabric backing adhered thereto which is produced by laying a sheet of unblown rubber onto a flat conveyor and pressing a coarse mesh fabric into the top of the rubber sheet either before or during the blowing and curing operation thereof.

More recently, such underlay has been produced by laying a sheet of unblown sponge rubber upon an open grid-like member, such as an open mesh conveyor belt, having spaced narrow supporting surfaces and openings therebetween so that the sponge rubber sags naturally into the openings to form a plurality of spaced downwardly extending and rounded protrusions or buttons. The rubber thus has a waffled or corrugated construction. As the rubber sags, an open meshed fabric is laid on the rubber so as to extend across the valleys of the corrugations and rest on the peaks thereof. This fabric adheres to these peaks as before, by being pressed into the sponge rubber, either before or during the blowing and curing thereof and becomes a backing for the underlay giving it lateral strength.

More recently, and as described in patent application Ser. No. 291,494, filed June 28, 1963, the open mesh fabric backing sheet has been made gas impervious by calendering into its interstices a sheet of non-blowing rubber. With this arrangement, expanding gases escaping from the blowing sponge rubber into the valleys of the corrugations are trapped and force the rubber downwardly a greater distance than would otherwise be the case. The buttons or protrusions are hollow and define with the backing sheet a generally closed cavity.

In either event, the outer surfacs of the protrusions or buttons are generally rounded (in the shape of a catenary) and substantial portions of the surface are at a substantial angle to the vertical. Thus the buttons are weak mechanically in this vertical direction. Also the surfaces of the buttons or protrusions have an unsightly textured surface. Moreover obtaining a uniform vertical dimension on all of the protrusions is quite difficult.

A still further problem of prior processes is that only atmospheric pressure opposes the expansion of the sponge rubber resulting in a product having different and inferior physical properties to the same compound cured under pressure in a hydraulic press or in a closed cavity.

A further problem, recognized by the present invention, is that the sponge rubber when curing is exposed to a hot oxygen bearing atmosphere similar to that used in one of the most severe age resistance tests used on rubber products. Thus, in heated platen press curing systems, air is carried into the curing unit by the movement of the rubber. In oven curing systems, the oxygen content of the air is somewhat reduced through the use of combustion byproducts of the heating units, but a damaging amount of oxygen is always brought into the oven in the form of fresh air makeup.

In either event, the result is that by the time the rubber has been vulcanized and cured, it has also been subjected to the equivalent of an accelerated aging process. The result is reduced age resistance, loss in resilience, and tear and crack resistance.

A further difficulty with prior processes has been that the sponge rubber has had to be specially compounded to not only sag rapidly under the force of gravity but to then have a blow and cure rate which would match the rate of sag.

To obtain these characteristics required a very careful balancing of all the ingredients in the rubber and often other desirable characteristics in a sponge rubber padding have had to be sacrificed to obtain this balancing.

The present invention contemplates a new and improved sponge rubber padding which overcomes all of the above referred to difficulties and others and provides a padding wherein the hollow protrusions have outer surfaces which have been protected from hot gases during the vulcanizing process, which are in fact molded, which may be shaped or angled as desired, and which have an improved surface texture.

The invention also contemplates a product resulting from use of a conveyor belt and method for making such padding which overcomes all of the above referred to difficulties and enables the shape, size and depth of the buttons or protrusions to be accurately and consistently controlled while at the same time protecting the surfaces of the vulcanizing or curing rubber from hot oxygen bearing gases.

An important object of the present invention is to provide a new and improved sponge rubber padding having substantially increased load bearing characteristics for a given weight of sponge rubber used.

Another object of the present invention is the provision of a sponge rubber padding which is economical to manufacture and durable in use.

Still another object of the present invention is the provision of an improved carpet underlay having buttons or protrusions extending from one side which have a generally flat bottom surface and substantially vertical sidewalls.

Still another object of the invention is the provision of a new and improved carpet underlay manufactured from a blowable sponge rubber compounded not to balance the sagging, cure and blow rates, but to provide a firmer, lighter, more resilient and more durable product.

Still another object of the invention is the provision of a new and improved carpet underlay of blown sponge rubber wherein the rubber during the vulcanizing and curing process has been exposed to a minimum amount of hot oxygen bearing gases.

Still another object of the invention is the provision of a cushion which is the product of a new and improved belt for the manufacture of sponge rubber underlay which permits the use of tougher, more resilient base polymers, reinforcing pigments and faster curing systems than will work with the present "gravity sag" systems of curing.

Still another object of the invention is the provision of a cushion which is the product of a new and improved conveyor belt for making carpet underlay having a plurality of protrusions or buttons comprised of a plurality of individual mold members relatively articulated to form such buttons or protrusions to a definite size and shape.

Another object of the invention is the provision of a cushion which is the product of a new and improved belt for manufacturing carpet underlay having a plurality of buttons or protrusions on one surface thereof which enables positive pressure control of a relatively high order on the unvulcanized stock during the curing process.

Another object of the invention is the provision of carpet underlay wherein each individual button or protrusion is molded under a pressure somewhat greater than atmosphere.

Another object is to provide a belt for a process of manufacturing sponge rubber underlay wherein curing takes place in an environment which substantially protects it from oxidation damage.

An object also is to provide a cup molded sponge rubber underlay wherein, to improve resistance to compression, iwth the aid of cups filled with sponge rubber or molded with thick vertical walls.

Still another object of the invention is to provide a new and improved sponge rubber cushion, wherein a bridge of molded material is formed between adjacent rows of buttons, the bridges acting as a mechanical interlock so that the entire area of the cushion is effectively bound together, and so that there is provided a larger area of adhesion between the backing and the rubber layer.

In accordance with the present invention, sponge rubber padding is provided comprised of a plurality of cupped protrusions or buttons of a distinct outer molded shape each having generally vertically extending sidewalls, a generally flat base and integrally joined at the upper edges.

Further in accordance with the invention, each such mold cut has a generally flat bottom wall and substantially straight and vertical sidewalls and is of a shape allowing arrangement of the mold cups in generally contacting side-by-side relationship to form a substantially continuous regularly recessed surface across the entire width and length of the belt.

FIG. 1 is a somewhat schematic longitudinal sectional view of apparatus capable of manufacturing padding according to the present invention;

FIG. 2 is a fragmentary enlarged plan view of a portion of the belt showing the hinge arrangement of successive transverse rows of molds;

FIG. 3 is a fragmentary longitudinal sectional view taken along lines 3—3 of FIG. 2;

FIG. 4 is a fragmentary cross-sectional view of an endless belt mold showing a device for constructing an alternative embodiment of the present invention;

FIG. 5 is an illustration representing the progressive separation of the belt mold from the finished sponge rubber sheet;

FIG. 6 is a fragmentary perspective view of one form of assembled belt;

FIG. 7 is a fragmentary plan view of another form of assembled belt;

FIG. 8 is a side perspective view of one of the cups of the belt of FIG. 7;

FIG. 9 is a fragmentary perspective view of the form of finished underlay, made with the belt of FIGS. 7 and 8;

FIG. 9a is a fragmentary sectional view taken on the line 9a—9a of FIG. 9.

FIG. 10 is a fragmentary plan view of still another form of belt;

FIG. 11 is a side perspective view of one of the cups of the belt of FIG. 10;

FIG. 12 is a fragmentary longitudinal sectional view of yet another form of belt;

FIG. 13 is a fragmentary longitudinal view of a composite cushion made from the belt of FIG. 12;

FIG. 14 is a fragmentary sectional view of a slightly modified form of composite cushion;

FIG. 15 is a perspective view of one of the cups of the belt used in making the cushion of FIG. 14.

Referring now to the drawings of selected embodiments of the invention chosen for the purpose of illustration, FIG. 1 shows a thin sheet of uncured, unblown sponge plastic 10, of which natural and synthetic rubber is a typical example compounded with conventional and necessary blowing and curing agents, being fed from calender rolls 11 onto an auxiliary conveyor belt 12 and then onto an endless main conveyor belt 13 constructed in accordance with the invention. This belt 13, as shown, passes over steam heated platens 19 for initial heating of the belt and then through a source of heat such as an oven 14. A roller or drum 15 carries the belt 13 at one end and a second drum or roller 16 carries the belt at the other end and returns it through a lower section 14' of the oven to the drum 15. For picking up the finished product, after it leaves the oven 14, there is a transfer belt 20 which passes through a cooling chamber 21 to a location adjacent a wind-up roll 22.

In accordance with the invention, the belt 13 as best shown in FIGS. 2, 3, and 6 is comprised of a plurality of individual upwardly opening, cup-like mold members 17 arranged in side-by-side relationship both transversely and longitudinally of the belt and so pivoted or hinged relative to each other in a longitudinal direction that the belt can pass around the rollers or drums at each end of the oven 14. Preferably, these mold members 17 are arranged in a plurality of transverse rows 18, 18', 18" in side-by-side relationship to form a generally continuous upwardly facing surface on which the sheet of sponge rubber can be supported as it moves through the oven.

Each mold member 17 may take any shape or combination of shapes lending itself to arrangement in a close adjacent relationship, such as squares, rectangles, hexagons or star shapes, as well as non-geometric shapes, but in the first illustrated embodiment, each mold member in top or plan view generally has a diamond shape defined by generally straight vertically extending sidewalls 23, 24, 25, and 26 integral with a flat bottom wall 27 such that each mold member opens upwardly to define a mold cavity of generally diamond shape.

Adjacent rows 18 of the mold members 17 may be movably associated so as to pass around the rollers 15 and 16 in any desired manner. Preferably they are hingedly or pivotedly interconnected and in the embodiment shown, the mold members 17 being arranged so that one diagonal is parallel to the length of the belt and the other diagonal extends transversely thereof and the individual rows 18 overlap in a longitudinal direction with the sidewalls 23, 24, 25 and 26 of one row parallel to and substantially abutting corresponding sidewalls of the adjacent row. A rod 28 extends transversely of the belt through suitable transversely aligned openings provided in the sidewalls 23, 24, 25 and 26. The openings are preferably located halfway between the transverse diagonal and the adjacent longitudinal end 29 of each mold member 17 and are closely adjacent to the flat bottom wall 27 so that the belt hinges in its bottom plane. With this arrangement, each row 18 is pivotally connected to its immediate adjacent row. The parallel closely spaced upper edges of the sidewalls 26 form a grid-like surface onto which the sheet 10 of rubber to be cured is fed.

Referring again to FIGS. 2, 3 and 6, pairs of sidewalls 23, 24 and 25, 26 forming the longitudinal ends 30 and 31 respectively of each mold member 17 are so formed to provide a relief 32 between adjacent rows and enable the rows to pivot or hinge relative to each other as they pass around the rollers 15 and 16. Thus the bottom wall 27 at its longitudinal ends curves upwardly as at 32 and then longitudinally as at 34 and then upwardly at a slightly divergent angle as at 35 to the top edge of the respective sidewall. The relief 32 is so located longitudinally that the inner surface of the relief 32 is generally coaxial and in close contact with the corresponding portion of the surface of rod 28. This prevents the sponge from blowing between these surfaces and locking itself to the belt. The rods 28 are shown as being round but they can be otherwise shaped as to closely mate with the inner surface of the relief of the mold member. The sidewalls 23, 24, 25 and 26 also preferably diverge slightly in an upward direction to provide a draft for facilitating removal of the rubber after it has been molded in the mold cavity. The bottom wall 27 may have suitable decorative designs, not shown, embossed therein. Inner surfaces 39 of the reliefs 32 in the bottom wall 27 also provide additional bearing surfaces for the rods 28.

The size of the individual mold members 17 depends upon a number of various factors such as the plasticity of the blowable rubber sheet 10 and the ultimate configuration of the lower surface of the carpet underpadding to be manufactured on the belt. In the preferred embodiment, however, each mold member 17 is approximately ¾ of an inch on a side and approximately ¼ of an inch deep. Obviously, these dimensions may be varied without departing from the invention.

The hinge formed by rod 28 extends transversely through all of the mold members 17 in one row and the ends thereof may be bent at right angles or other means may be provided on such ends to prevent their longitudinal displacement from the belt.

In the manufacture of carpet underlay in accordance with the present invention and using the belt 13 of the invention, it will be appreciated that the belt 13 moves continuously through the oven and returns around the rollers 15 and 16. The blowable rubber sheet 10 is calendered to a predetermined thickness by the rolls 11 and is also warmed thereby to a soft and tacky condition.

The sheet 10 supported by the belt 12 moves from the rolls 11 to the belt 13 and first comes into supporting contact with the upper edges of the members 17 at a supporting portion at 36. Because of its soft and tacky condition, the sheet 10 immediately begins to generate sagging portions 37 which sag into cavities 42 of the members 17. The sheet 10 then moves with the belt under a backing sheet 38 which is fed continuously to the sheet 10 from a supply roller 40 at a speed corresponding to the velocity of the belt 13. The backing sheet 38 engages the upper surface of the supported portion 36 and is spaced from the sagging portions 37.

The backing sheet is preferably non-porous in the first described embodiment, and consists of a fabric and a thin sheet of non-blowing rubber calendered thereinto. A feed or pressure roll 41 bears against the upper surface of sheet 38 and presses it downwardly to insure full engagement with all the supporting portions 36. The supporting portions being tacky adhere to the sheet 38. The sagging portions 37 now define a plurality of closed cavities 42. The pressure caused by the pressure roll 41 is so controlled that it does not cut through the sheet 10 at the peripherally supporting portions 36.

The sheet 10, the belt 38 and the belt 13 then move under a preferably impervious pressure belt 43, moving at the same speed. This belt 43 rests on the upper surface of the sheet 38 and lightly holds it in pressure engagement with the supporting portions 36 while the whole assembly moves into the heated oven 14.

Within the oven 14, additional means are provided for maintaining the pressure of the belt 43 onto the upper surface of the sheet 38. Such means may take a number of different forms, but preferably such means take the form of a drag belt 44 resting on top of the pressure belt 43 and prevented from movement therewith by any suitable means. The combination of the two weights insures a seal between the supporting portions 36 and the sheet 38 sufficiently tight to restrict the escape of gas during the curing operation to produce a differential pressure from expanding gases for the molding operation.

As the sheets 10 and 38 continue to move through the oven, they are further heated. The rubber in the sheet 10 sags even more into the cavity of the mold members 17, as shown at the right side of FIG. 5. At the same time, the rubber of the sheet 10 is heated to a temperature such that the blowing compounds contained therein begin to evolve as gas. This gas causes the rubber to expand. Some of the gas may get trapped in spaces 46. On those occasions when the sheet 38 is an impervious layer the expanding gas backs up against the sheet 38 and forces the sheet 10 downwardly into engagement with the inside metal mold surfaces. Should the sheet 38 be open mesh material, the expanding gas will back up against the pressure belt 43 and the same result will occur. Then will follow a relatively uniform rapid flow of heat by conduction from the hot metal surfaces of the mold members 17, as contrasted with the ineffective heating by radiation in former practices where the rubber layer was merely suspended on a wire mesh. In the former practice the limited heating by conduction where the rubber sheet folded over the wire actually created a detrimental uneven heating, much slower than the present technique.

The pressure created, as described, is sufficient to slightly densify the external surface on the rubber in engagement with the surfaces of the mold members 17 and to, in effect, give to the rubber a relatively tough impervious skin. Also, and more importantly, the rubber, instead of expanding outwardly simply against atmospheric pressure, takes on a characteristic similar to that when expanded into a mold. Trapped air in the cavities 42 when treated in the oven assists in pressing the material of the sheet 10 into the mold member 17, as the trapped air expands when heated.

Tests have shown that the same compound cured on a conventional open woven wire belt is considerably inferior in compression deflection characteristics than the compound molded while it is being cured as above described.

The curing compounds contained in the rubber of sheets 10 and 38 now begin to take effect and the blown and shaped material of sheet 10 and the rubber of sheet 38 cure in the shape shown at the left end of FIG. 5 with sheet 38 firmly adhered to the supporting portions 36.

After the curing and blowing operation just described is completed, the belt 13 moves the sheets 10 and 38, now indicated as composite cushion 45, from beneath the pressure belt 43 and thereafter the composite cushion 45 is removed from the belt 13, picked up by the transfer belt 20 by which it is passed through the cooling chamber 21 and from there to the wind-up roll 21 where it is wound into rolls 46 for shipment.

The belt 13 meanwhile passes downwardly around the roller 16 and moves back to the entrance end of the oven 14, where it again passes around roller 15 and returns to the position to accept the uncured rubber sheet 10 from auxiliary conveyor belt 12.

It will be appreciated that in some instances the backing sheet 38 may be omitted, assuming that its lateral strength is not needed or the backing sheet 38 need not go through the oven with the sheet 10 but instead may be cemented to the blown sponge cup molded rubber after the rubber has completely cured and even cooled. Also a simple fabric without any rubber filling its interstices may be employed. In any of such events, the pressure belt 43 should then be gas impervious so that the gases released by the blowing rubber are still trapped within cavities formed by the sagging rubber portions 37 and the lower surface of the belt 43. The belt 43 should preferably be made of a gas impervious material. A typical satisfactory material is Silicon or Teflon coated glass fibre.

While many portions of the apparatus are to a degree conventional, the belt 13 used with the apparatus is one peculiarly adapted to the practice of the invention. The sponge rubber composite cushion, made in accordance with the invention, may have, when viewed from the bottom side, a plurality of discrete generally diamond shaped buttons or projections 50 of blown, cured rubber having an outer surface corresponding to the shape of the inside of the mold members 17 and defined by the generally flat bottom wall 27 and generally straight vertically extending sidewalls 23, 24, 25 and 26. The sidewalls of adjacent buttons 50 are generally parallel and spaced a distance apart equal to the thickness of the abutting sidewalls of the mold members 17. The outer surfaces of the buttons 50 have a distinct appearance of having been molded and as such have what may be referred to as a reinforcing skin. All buttons are of exactly the same vertical height. Should members 17 of varying heights be employed, the buttons would have a similar variation in height. The flat bottom wall 27 is interrupted across one corner by a depression or groove resulting from the rods 28 which pass on the inside of the mold member 17.

The buttons 50 are integrally joined by a thin web 51 at the upper ends of the sidewalls. This web generally has been prevented from blowing by the weight of the belt 43 and is of somewhat denser rubber. In the composite cushion of the preferred embodiment, the sheet 38 is adhered to the upper surface of this web 51 so that viewed from the top, the composite cushion of the preferred embodiment has a continuous flat surface, but the cushion itself has a plurality of sealed cavities immediately under this sheet 38 and otherwise defined by the buttons 50. Absent the sheet 38, the sponge rubber itself underneath is made up of a series of upwardly facing concavities.

In the embodiment of the invention illustrated in FIGS. 7, 8 and 9 alterations are made in the construction of cup-like mold members 55, one of which is pictured by itself in FIG. 8. Each mold member consists of sidewalls 56, 57, 58 and 59. Sidewalls 56 and 57 converge to form a corner 60 and sidewalls 58 and 59 converge to form a corner 61. Similarly sidewalls 56 and 59 converge to form a corner 62 whereas sidewalls 57 and 58 converge to form a corner 63. Axially alligned holes 64 and 65 are provided in the sidewalls 56 and 57 respectively to accommodate one of the rods 66. Similar holes 67 and 68 are provided respectively in the side walls 58 and 59, likewise to accommodate one of the rods 66.

The sidewalls 56, 57, 58 and 59 together with a bottom wall 69 form a cavity indicated generally by the reference character 70. Below the corners 60 and 61 respectively are reliefs 72 and 73, formed by bending adjacent the corners of the bottom wall 69 upwardly whereby to provide additional support for the respective rods 66 when they are threaded through the holes provided for them. Also the sharp inside corners at these points are somewhat difficult to fill with expanding sponge rubber and by providing the reliefs a neater over-all finish is produced.

Of special importance is the provision of cutouts in the sidewalls and typical of these is the cutout 74 which extends inwardly from an edge 75 of the sidewall 56. Similarly cutouts 76, 77, and 78 are formed in the sidewalls 57, 58 and 59 respectively. In addition there are provided cutouts 79 and 80 at opposite ends of the sidewall 56. A matching cutout 81 in the sidewall 57 adjoins the cutout 79 and a matching cutout 82 in the sidewall 59 lies opposite the cutout 80. The other corners 61 and 63 are provided with similar cutout portions. Extending upwardly or inwardly of the bottom wall 69 is a protuberance 81 which extends into the cavity 77.

All of the mold members 55 are identical and are hinged together by employment of the rods 66 in the manner illustrated in FIG. 7 to form a conveyor belt indicated generally by the reference character 82. The conveyor belt 82 is made up in substantially the same fashion as the main conveyor belt 13 heretofore described.

The operation for making use of the conveyor belt 82 is the same as the operation described in connection with FIGS. 1 through 5 inclusive, wherein a sheet of blowable sponge rubber is applied first to the edges of the sidewalls like the edge 75, over which is applied a backing sheet like the backing sheet 38. The two sheets are then passed through the oven 14, this time in position upon the conveyor belt 82 wherein the same expanding of the blowable sponge rubber sheet takes place. The product resulting from use of the conveyor belt 82 is the composite cushion 83 shown in perspective in FIG. 9. On this occasion, however, deformation of the sheet 10 results in the formation of buttons 84 of slightly different configuration. The cutouts 74, 76, 77 and 78 result in the formation of bridges 85 which span recesses 86 and 87 thereby interconnecting every side of all of the buttons 84. In addition bridge fillers 88 are formed at each four corner intersection as a result of blowable sponge rubber from the sheet 10 filling the cutout spaces such as those formed by the cutouts 79, 80, 79' and 80'. A sheet 38' is fastened to the edges 75 of the buttons 84 in the same manner as heretofore described.

Further still, by providing protuberances 81 on only certain of the mold members 55, such for example as those selected and depicted in FIG. 7. The protuberances can be arranged in the form of letters or figures, such for example as the letter A of FIG. 7. When this is done, the protuberances will form complementary depressions at midportions of the resulting tops of the buttons 84 and these depressions can be used to spell out letters, numbers and signs.

When a composite cushion like the cushion 83 is formed in the manner described, there will be considerably more resistance to folding and bending of the composite cushion once it has been formed and cured.

Still other pattern effects can be produced by building sundry configurations into the walls of cup-like mold members, like for example the mold members 90 of FIGS. 10 and 11. One such mold member is shown in perspective view in FIG. 11 and a multiplicity of such mold members are shown in FIG. 10 made into a conveyor belt indicated generally by the reference character 91 wherein they are hingedly linked by rods 92.

As shown in FIG. 11 the mold members 90 have sidewalls 93 and 94. The sidewalls 93, for example, has a semi-cylindrical exteriorly convex portion 95, provided midway between opposite ends with a cutout 96. Additional cutouts 97 and 98 at respective opposite ends join respective fillets 99 and 100. Flat portions 101 and 102 lie below the respective cutouts 97 and 98. Holes 103 and 104 are provided in the flat portions 101, and 102, the holes being for the accommodation of rods 92.

The sidewall 94 is similarly formed with an exteriorly convex semi-cylindrical portion 105, fillets 106 and 107, and interconnecting flat portions 108 and 109. A cutout 110 is provided in the convex portion 105 and cutouts 111 and 112 on opposite sides of it. By making all of the mold members 90 identical, they fit together in the unique pattern illustrated in FIG. 10 and when the conveyor belt 91 of FIG. 10 is used to load a composite cushion similar to the composite cushions 45 and 83, a new composite cushion will result. The cushion 91, however, will have the characteristic pattern initially built into the conveyor belt 91. Because of the cutouts described in FIG. 11, as well as the fillets, the cushion 91 will enjoy the advantages of the interconnecting bridge fillets described in connection with FIGS. 7, 8 and 9.

When a substantially flat composite cushion like the composite cushion 115 of FIG. 13 is desired, shallower cup-like mold members 116 are made use of. In this instance mold members will have sidewalls 117, 118, 119 and 120 and a bottom wall 121. If desired, these can be made up in a diamond-like form such as illustrated in FIGS. 2 and 7, for example, or in some other form such as is exemplified by FIG. 11. More particularly in this form, however, the sidewalls are only slightly greater in height than the diameter of rods 122. When the mold members 116 are hinged together by rods 122, they form a conveyor belt indicated generally by the reference character 123, and this belt used in the same manner as described in connection with FIGS. 1 through 5 inclusive. The resulting product will be a product like the composite cushion 115 in which an upper side 124 will be substantially flat as is also a lower side 125. Relatively narrow air spaces 126 remain in the interior. One of the advantages is that the cushion with opposite flat surfaces meets certain critical specification where a greater degree of compressive resistance is desired.

If desired, the sheet 10 may be compounded so that when heated to create sponge rubber, the sponge rubber completely fills the mold member 17 leaving on depression of the nature of those heretofore described as present in the composite cushion 83. A cushion of this description has greatly enhanced compression resistance and all the benefits of the bridges described and shown in FIGS. 9 and 9a.

Another form of the product providing relatively greater resistance to compression is shown in FIG. 14 and is formed by use of cups like those shown in FIG. 15 made up into an appropriate belt. The deep indentations are formed in mold members 127 by appreciably enlarged protuberances 128, similar in function to the protuberances 81. A decorative character like the triangle 129 may be added to the protuberance 128. The enlarged protuberance 128 provides a deep depression 130 in molded elements 131 carried by what may be an open mesh sheet 132 of a composite cushion 133. Relatively thick sidewalls 134, in this form of cushion, have a large expanse of vertical surface, and act as strong weight supporting columns, stiffened by bridges 85' and 88'. There is also appreciably greater metal to rubber surface contact in a mold member suited to form the molded element 131 and therefore a more rapid uniform transfer of heat from the hot belt to the rubber results. Oven time for producing the composite cushion 133 is therefore shorter.

It will thus be seen that embodiments of the invention have been described which accomplish all of the objects of the invention heretofore set forth and others and that a carpet underlay and a belt and method of manufacturing same have been described which are novel and produce highly improved results.

In particular, such results may be generally defined as a carpet underlay having a plurality of buttons all of a uniform vertical thickness, all having a generally flat bottom surface, all having generally vertical sidewalls, and all having the lower exposed surfaces with a molded texture and contour which are pleasing in appearance.

The rubber employed, instead of being compounded as a balancing of sagging, blowing and curving characteristics, can be compounded to give maximum resilience and maximum life. It will be apparent that the rubber itself during the course of curing has been exposed a minimum amount to hot oxygen bearing gases and therefore should have a maximum life and highly improved other characteristics.

Having described the invention herein, what is claimed as new and sought to be secured by Letters Patent is:

1. A composite cushion of relatively resilient material comprising two sheets of different composition, form and thickness, one of said sheets comprising a substantially flat sheet of impervious stretch resistant non-blown rubber material providing a continuously uninterrupted area on one side, a second sheet of blown sponge rubber material comprising a multiplicity of buttons on the side facing away from said flat sheet, a series of long narrow recesses in mutually intersecting relationship separating sides of said buttons one from another, and bridges of material of said second sheet spanning said recesses and integrally joined to the sides of said buttons and said flat sheet, whereby to provide an interconnecting system of bridging sections for the buttons throughout the area of said composite cushion.

2. A composite cushion of relatively resilient material comprising two sheets of different composition, form and thickness, one of said sheets comprising a substantially flat sheet of impervious stretch resistant non-blown rubber material providing a continuously uninterrupted area on one side, a second sheet of blown sponge rubber material comprising a multiplicity of buttons on the side of said sheet facing away from said flat sheet, said buttons having central cavities therein, edges of said cavities being in adhesive engagement with edges of adjacent cavities and adjacent areas of said substantially flat sheet, a series of long narrow recesses in mutually intersecting relationship separating sides of said buttons one from another, bridges of material of said second sheet extending into and spanning inner portions of said recesses adjacent said edges and integrally joined to the sides of said buttons, whereby to provide an interconnecting system of bridges for the buttons throughout the area of said composite cushion.

3. A cushion according to claim 2, wherein a central portion at the bottom of each depression extends inwardly whereby to provide a relatively thick perimetral sidewall.

4. A composite cushion of relatively resilient material comprising two sheets of different composition, form and thickness, one of said sheets comprising a substantially flat sheet of impervious, stretch resistance non-blown rubber and fiber reinforcing material providing a continuously uninterrupted area on one side, a second sheet of blown sponge rubber material comprising a multiplicity of buttons on the side facing away from said flat sheet, a series of long narrow recesses in mutually intersecting relationship separating sides of said buttons one from another, bridges of material of said second sheet spanning said recesses and integrally joined to the sides of said buttons, and bridge fillers of material of said second sheet joining all mutually adjacent corners of said buttons, whereby to provide an interconnecting system of bridges and bridge fillers for the buttons throughout the area of said composite cushion.

5. A composite cushion as in claim 1 wherein said flat sheet is a fiber reinforced non-blown rubber sheet.

6. A composite cushion as in claim 1 wherein said long narrow recesses have a width no greater than the thickness of walls forming said buttons.

7. A composite cushion as in claim 1 wherein walls forming said buttons are substantially perpendicular to the plane of said flat sheet.

8. A composite cushion as in claim 1 wherein bottoms of said buttons are flat and lie in a plane parallel to the plane of said flat sheet.

References Cited

UNITED STATES PATENTS

| | | | |
|---|---|---|---|
| 2,739,093 | 3/1956 | Bull | 161—127 |
| 2,821,244 | 1/1958 | Beck | 161—127 |
| 3,231,454 | 1/1966 | Williams | 161—122 |
| 3,285,793 | 11/1966 | Chavannes | 161—122 |
| 3,294,387 | 12/1966 | Chavannes | 161—127 |

MORRIS SUSSMAN, Primary Examiner

U.S. Cl. X.R.

5—345; 161—123, 160